(12) United States Patent
Xu et al.

(10) Patent No.: US 12,681,912 B2
(45) Date of Patent: Jul. 14, 2026

(54) BACKUP OF A SAAS APPLICATION WITH RELATIONAL DATA

(71) Applicant: Rubrik, Inc., Palo Alto, CA (US)

(72) Inventors: Jun Xu, Kirkland, WA (US); Jonathan Carlyle Derryberry, Union City, CA (US); Nikita Awasthi, Sunnyvale, CA (US); Harsha Vattem, Sunnyvale, CA (US); David Anthony Terei, New York, NY (US); Anshul Gupta, Mountain View, CA (US); Sai Kiran Katuri, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 120 days.

(21) Appl. No.: 18/652,384

(22) Filed: May 1, 2024

(65) Prior Publication Data

US 2026/0010523 A1      Jan. 8, 2026

(51) Int. Cl.
| | |
|---|---|
| *G06F 17/00* | (2019.01) |
| *G06F 11/1446* | (2026.01) |
| *G06F 16/21* | (2019.01) |
| *G06F 16/28* | (2019.01) |

(52) U.S. Cl.
CPC ........ G06F 16/219 (2019.01); G06F 11/1446 (2013.01); G06F 16/211 (2019.01); G06F 16/284 (2019.01); *G06F 2201/80* (2013.01); *G06F 2201/84* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 7,145,837 | B2 * | 12/2006 | Herring | G06F 1/14 |
| | | | | 368/46 |
| 11,144,233 | B1 * | 10/2021 | Singhal | G06F 3/0619 |
| 2016/0306709 | A1 * | 10/2016 | Shaull | G06F 16/27 |
| 2017/0180394 | A1 * | 6/2017 | Crofton | G06F 21/64 |
| 2023/0022737 | A1 * | 1/2023 | Takashige | G06N 5/022 |
| 2023/0096071 | A1 * | 3/2023 | Sarkar | G06F 11/1469 |
| | | | | 714/6.3 |
| 2023/0222038 | A1 * | 7/2023 | Kunzle | G06F 11/1461 |
| | | | | 707/648 |
| 2024/0004867 | A1 * | 1/2024 | Pandis | G06F 16/254 |

* cited by examiner

*Primary Examiner* — Hung D Le

(74) *Attorney, Agent, or Firm* — Holland & Hart LLP

(57) ABSTRACT

Methods, systems, and devices for data management are described. A method may include obtaining a new snapshot of a relational database of a source computing environment, comparing the new snapshot of the relational database to a prior snapshot of the relational database, updating, in response to the comparison indicating that data of a row of a relational database table changed between the prior snapshot and the new snapshot, a field of a second versioning control column of a corresponding row of a backup database table of the set of backup database tables to indicate a version of the new snapshot, and adding, in response to the comparison indicating that the data of the row of the relational database table changed, an additional row to the backup database table, where a field of a first versioning control column of the additional row includes an indication of the version of the new snapshot.

20 Claims, 11 Drawing Sheets

300 snappable_schema_columns

Figure 3:
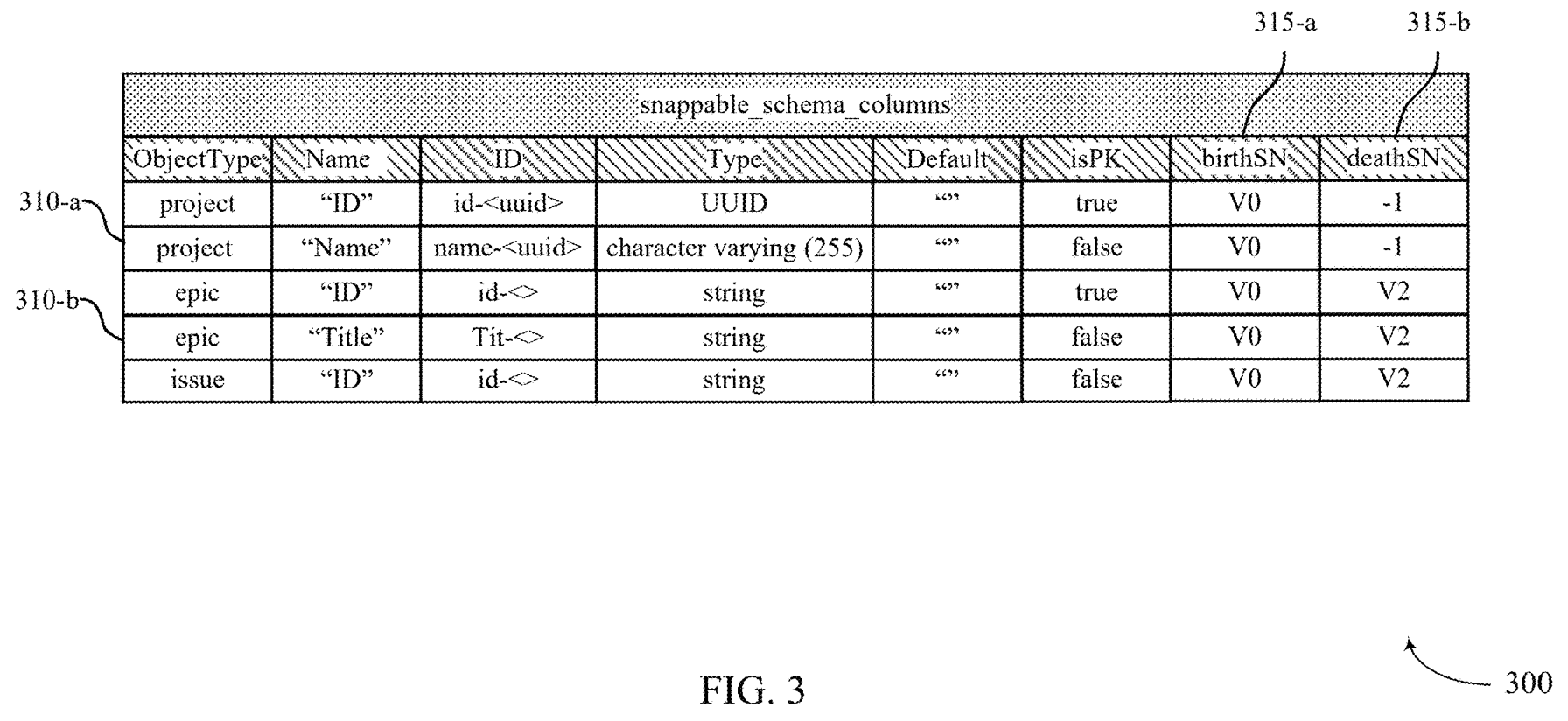

| ObjectType | Name | ID | Type | Default | isPK | birthSN | deathSN |
|---|---|---|---|---|---|---|---|
| project | "ID" | id-<uuid> | UUID | "" | true | V0 | -1 |
| project | "Name" | name-<uuid> | character varying (255) | "" | false | V0 | -1 |
| epic | "ID" | id-<> | string | "" | true | V0 | V2 |
| epic | "Title" | Tit-<> | string | "" | false | V0 | V2 |
| issue | "ID" | id-<> | string | "" | false | V0 | V2 |

Figure 9:
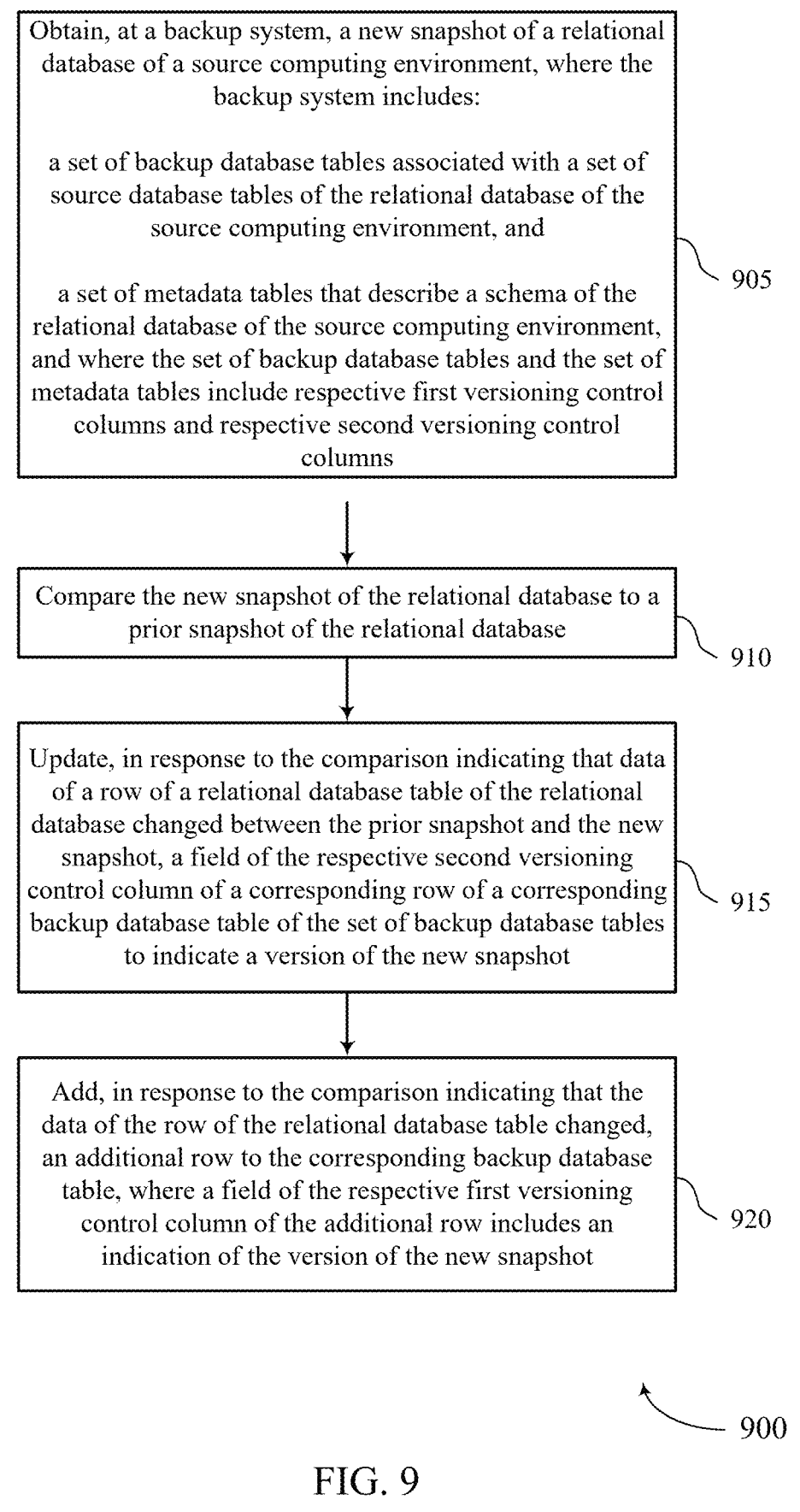

Obtain, at a backup system, a new snapshot of a relational database of a source computing environment, where the backup system includes:

a set of backup database tables associated with a set of source database tables of the relational database of the source computing environment, and a set of metadata tables that describe a schema of the relational database of the source computing environment, and where the set of backup database tables and the set of metadata tables include respective first versioning control columns and respective second versioning control columns

— 905

Compare the new snapshot of the relational database to a prior snapshot of the relational database

— 910

Update, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot

— 915

Add, in response to the comparison indicating that the data of the row of the relational database table changed, an additional row to the corresponding backup database table, where a field of the respective first versioning control column of the additional row includes an indication of the version of the new snapshot

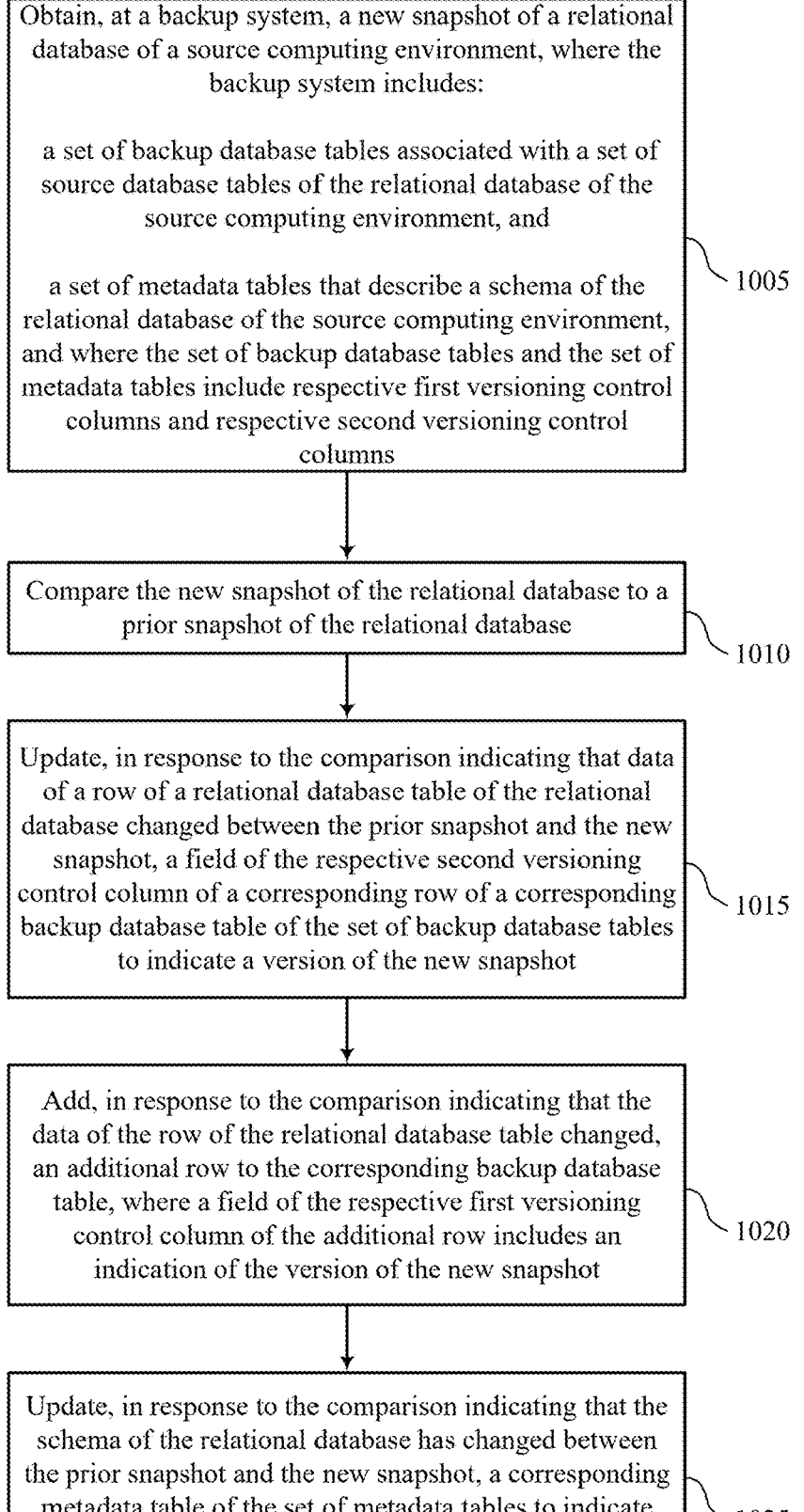

Obtain, at a backup system, a new snapshot of a relational database of a source computing environment, where the backup system includes:

a set of backup database tables associated with a set of source database tables of the relational database of the source computing environment, and a set of metadata tables that describe a schema of the relational database of the source computing environment, and where the set of backup database tables and the set of metadata tables include respective first versioning control columns and respective second versioning control columns

1005

Compare the new snapshot of the relational database to a prior snapshot of the relational database

1010

Update, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot

1015

Add, in response to the comparison indicating that the data of the row of the relational database table changed, an additional row to the corresponding backup database table, where a field of the respective first versioning control column of the additional row includes an indication of the version of the new snapshot

1020

Update, in response to the comparison indicating that the schema of the relational database has changed between the prior snapshot and the new snapshot, a corresponding metadata table of the set of metadata tables to indicate that the schema has changed

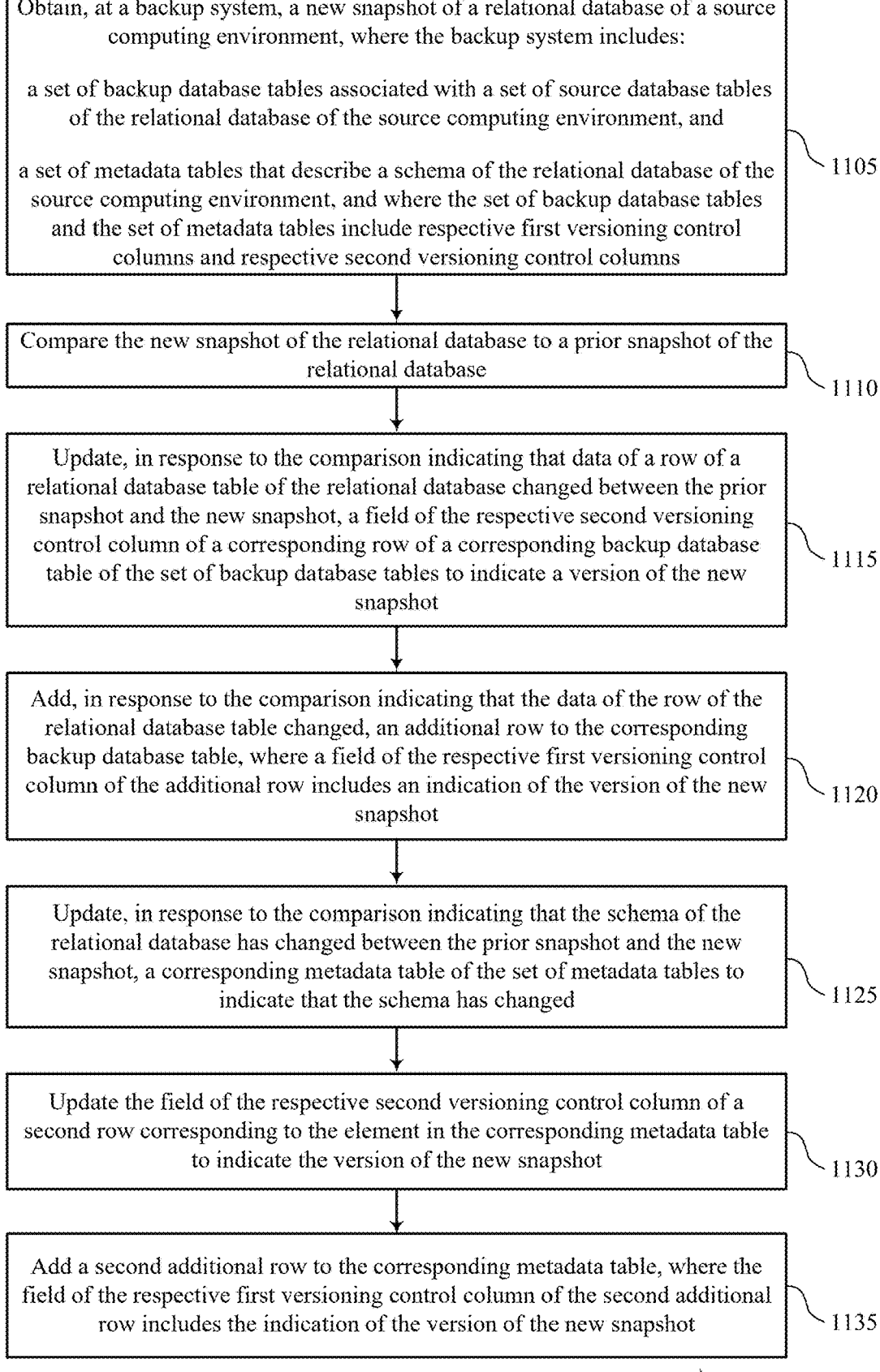

Obtain, at a backup system, a new snapshot of a relational database of a source computing environment, where the backup system includes:

a set of backup database tables associated with a set of source database tables of the relational database of the source computing environment, and a set of metadata tables that describe a schema of the relational database of the source computing environment, and where the set of backup database tables and the set of metadata tables include respective first versioning control columns and respective second versioning control columns

1105

Compare the new snapshot of the relational database to a prior snapshot of the relational database

1110

Update, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot

1115

Add, in response to the comparison indicating that the data of the row of the relational database table changed, an additional row to the corresponding backup database table, where a field of the respective first versioning control column of the additional row includes an indication of the version of the new snapshot

1120

Update, in response to the comparison indicating that the schema of the relational database has changed between the prior snapshot and the new snapshot, a corresponding metadata table of the set of metadata tables to indicate that the schema has changed

1125

Update the field of the respective second versioning control column of a second row corresponding to the element in the corresponding metadata table to indicate the version of the new snapshot

1130

Add a second additional row to the corresponding metadata table, where the field of the respective first versioning control column of the second additional row includes the indication of the version of the new snapshot

BACKUP OF A SAAS APPLICATION WITH RELATIONAL DATA

FIELD OF TECHNOLOGY

The present disclosure relates generally to data management, including techniques for backup of a software-as-a-service (SaaS) application with relational data.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 3 shows an example of a database table that supports backup of a SaaS application with relational data in accordance with aspects of the present disclosure.

FIGS. 9 through 11 show flowcharts illustrating methods that support backup of a SaaS application with relational data in accordance with aspects of the present disclosure.

DETAILED DESCRIPTION

Figure 1:
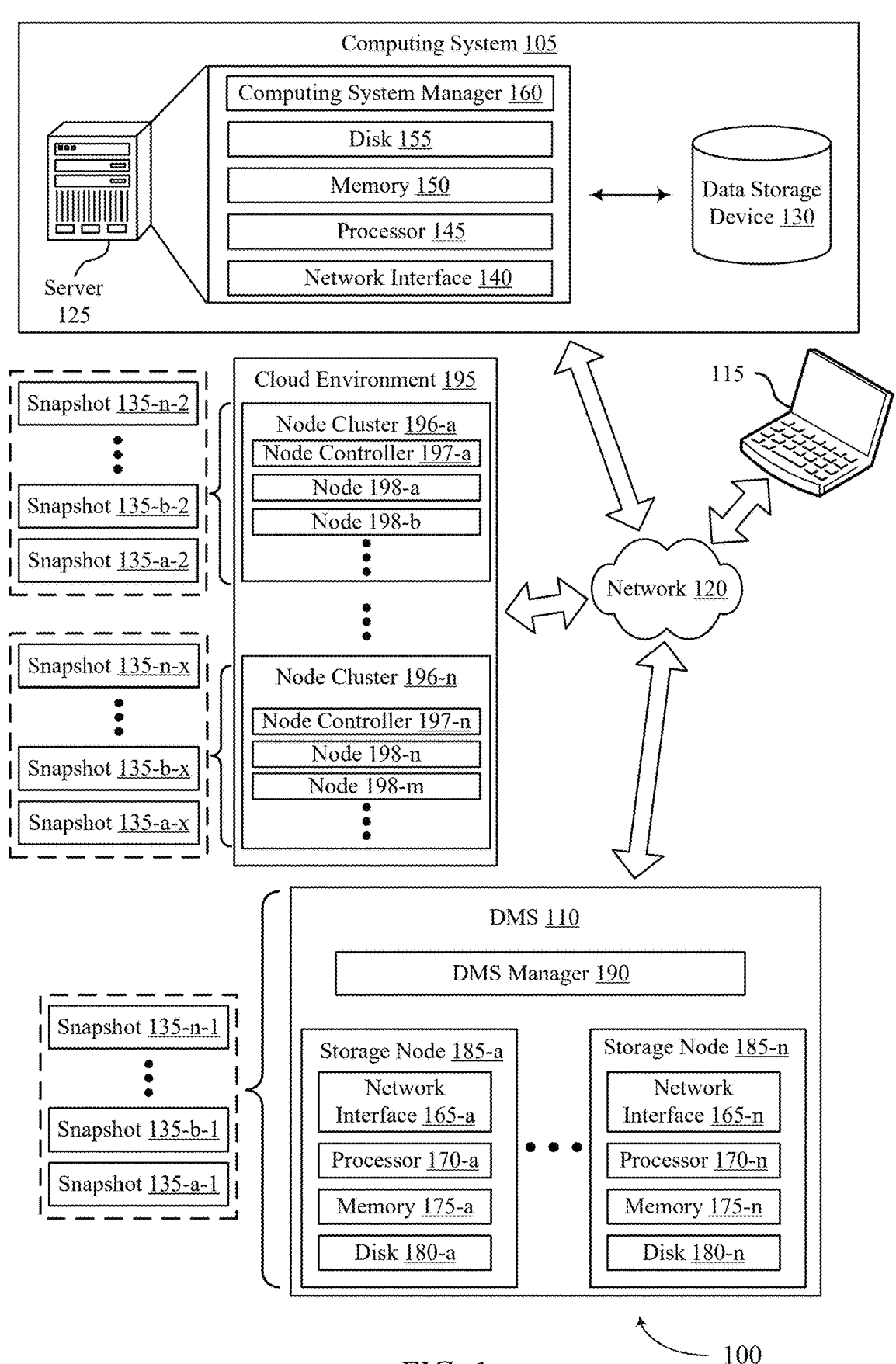
FIG. 1 illustrates an example of a computing environment that supports backup of a software-as-a-service (SaaS) application with relational data in accordance with aspects of the present disclosure.

Data protection systems may protect (e.g., back up) data of software-as-a-service (SaaS) platforms. These data protection systems may support backup of non-relational data, such as exchange accounts, emails, files, etc. to cloud storage (e.g., binary large object (BLOB) storage). However, in some cases, the SaaS platforms support applications that access data of relational databases. Some backup solutions do not adequately support data protection for data in relational databases and are deficient regarding data protections for data relationships in the relational database. Additionally, such backup solutions may not support searching (e.g., cascading search) of data within the data protection system, may be inefficient in terms of garbage collection, and may not be scalable or secure, among other issues. For example, because these backup solutions may not support relational backup support, cross-snappable searching may not be supported.

Techniques described herein support a comprehensive backup store that includes techniques for storing backups of a SaaS application including techniques for storing relational database schema for the SaaS application in addition to the SaaS application data, which may include a rich amount of relationships. The data protection system may create, within the backup systems, tables for each backend table of the source SaaS application and additional metadata tables that describe the schema information of the relational database of the source system. Each of the application data tables and the metadata tables in the backup system include versioning control columns, and these columns reference the corresponding snapshot version from which the data of the row is obtained and whether the data is live or stale (e.g., no longer exists or has changed). The application data tables may include additional metadata columns that include information associated with the snapshot from which the data is captured as well as a hash value of the data in the row, which supports deduplication and immutability check. When changes are made to the source system, corresponding rows of the backup system are updated to indicate these changes (e.g., by changing the versioning control columns) and additional rows are added to reflect the changed data. However, data will not be deleted in the backup system in response to a change. Rather, the versioning control columns are updated to indicate that the data is "dead" (e.g., stale). This allows prior snapshot versions to be recovered and supports searching for changed data between or within snapshot data. These techniques are also applicable to the metadata tables that describe the schema of the database. As described herein, the backup techniques may support backing up application data of SaaS platforms rather than raw data of its backend database (e.g., a database file system), which thereby allows for fine-grained data recovery at individual table or row level. These and other techniques are described in further detail herein with respect to the figures.

FIG. 1 illustrates an example of a computing environment 100 that supports backup of a SaaS application with relational data in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-intime version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some cases, the source computing system (e.g., the computing system 105) for which the DMS 110 and/or the cloud environment 195 provides backup services may include an application (e.g., SaaS application) that accesses data that is stored in relational databases. That is, the computing system 105 may include applications that access data of a relational database system. The DMS and/or the cloud environment 195 may implement the techniques described herein to support backup of the data of the relational database system. For example, the backup system (e.g., the DMS 110 and/or the cloud environment 195) may create, within the backup system, tables for each table included in the source relational database and additional metadata tables that describe the schema information of the relational database of the source system. Each of the application data tables and the metadata tables in the backup system include versioning control columns, and these columns reference the corresponding snapshot version from which the data of the row is obtained and whether the data is live or stale (e.g., no longer exists or has changed). The application data tables may include additional metadata columns that include information associated with the snapshot from which the data is captured as well as a hash value of the data in the row, which supports garbage collection. When changes are made to the source system, corresponding rows of the backup system are updated to indicate these changes (e.g., by changing the versioning control columns) and additional rows are added to reflect the changed data. However, data may not be deleted in the backup system in response to a change. Rather, the versioning control columns are updated to indicate that the data is "dead" (e.g., stale). This allows prior snapshot versions to be recovered and supports searching for changed data between snapshot data. These techniques are also applicable to the metadata tables that describe the schema of the database.

Figure 2:
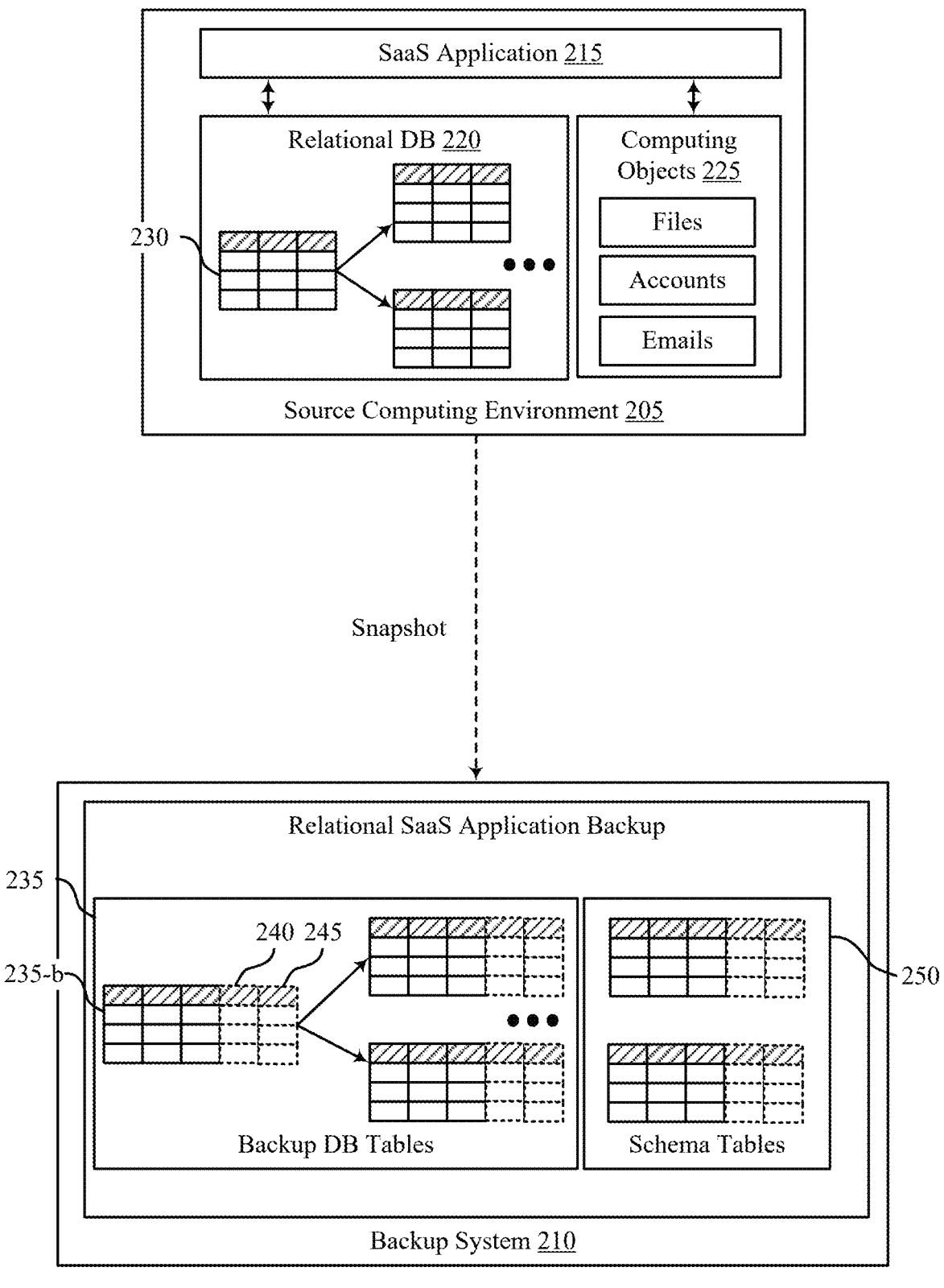
FIG. 2 shows an example of a computing environment that supports backup of a SaaS application with relational data in accordance with aspects of the present disclosure.

FIG. 2 shows an example of a computing environment 200 that supports backup of a SaaS application with relational data in accordance with aspects of the present disclosure. The computing environment 200 includes a source computing environment 205 and a backup system 210. The target computing environment may be an example of the computing system 105 as described with respect to FIG. 2, and the backup system 210 may be an example of the DMS 110 and/or the cloud environment 195 described with respect to FIG. 1. The source computing environment 205 may represent a SaaS platform and may facilitate execution of various applications (e.g., SaaS application) for various users. The SaaS application 215 may access one or more data sources to support various services. For example, the SaaS application may access data stored in a relational database 220 and/or computing objects 225 (e.g., non-relational data), which may include files, accounts, emails, virtual machines, and the like.

Some backup systems may support backup of the computing objects 225. That is, the source computing environment 205 may support generation of snapshots of the computing objects 225, and the snapshots may be stored and/or managed by a backup system (e.g., the backup system 210), as described herein. As such, the computing objects 225 may be referred to as snappables.

Techniques described herein support backing up, by the backup system 210, of the SaaS application 215 including the relational database 220 rather than raw data of a source computing environment 205. In some cases, the backup system 210 may be implemented in a cloud based platform that is configured to access the source computing environment 205. For example, the backup system 210 may be implemented as Google Cloud Platform, Azure VNet solution, or a combination thereof. In one example, a control plane is implemented in the Google cloud platform and the data plane is managed in Azure VNet. The backup system 210 provides storage to hold continuous backup for a schema of a relational database 220 of the target computing environment with full and incremental changes and the relational data of the relational database 220 with full and incremental changes. Additionally or alternatively, the techniques described herein support application data schema upgrades. That is, the backup system 210 may support backing up changes to the schema of the relational database 220 of the source computing environment 205. Changes may include, for example, an addition of columns to data tables, changes in relationships between objects, or the like. Additionally or alternatively, the solution provided by the backup system 210 may support restoration of a database prior to a schema change. As described in further detail herein, the backup system may include a relational database with a particular schema design with versioning support to hold the source application data and the schema. As described herein, the relational database 220 may include a rich relationship set in order to support the SaaS application 215. The techniques described herein support back up of those rich relationships as well as fine-grained data recovery at individual table or row level.

In some cases, the backup system 210 supports a real-time or near real-time cascading search over time series data (e.g., in the backup system 210), by supporting an index on the relational database tables in the backup system 210. These techniques allow a search API to support search over the history of a table and across multiple tables. The versioning schema design described herein supports incremental changes to allow identification of differences between two snapshots. In some examples, the backup system supports large file, binary, and/or text based content that is non-relational data. Such data may be stored in a non-relational storage solution but may be linked to the relational database backup. Moreover, the backup system 210 may include a hash column that supports identification and skipping (as well as deletion via garbage collection) of duplicated input. In some cases, the backup system may be implemented in multi-tenant storage with role-based access control (RBAC), autoscaling, and high-availability. As described in further detail herein, the data may be encrypted in-transit and/or at-rest to support improved data security.

The backup system 210 may generate a backup database table (e.g., backup database tables 235) for each source database table (e.g., database table 230) of the source computing environment 205 (e.g., the SaaS platform). Each backup database table may include the data of the corresponding database table of the relational database 220 of the source computing environment 205. For example, the backup database table 235-b stores the data of the source database table 230. Additionally, the backup system 210 adds, within the backup database tables 235, additional columns that support various aspects to the backup solution described herein. The additional columns may include versioning control columns and/or metadata columns. For example, the backup database table 235-b includes a first versioning control column 240 and a second versioning control column 245.

The backup system 210 may also generate a set of metadata tables 250 that describe the schema of the relational database 220. For example, the set of metadata tables 250 may include a metadata table for each element of the relational database 220, such as a table for columns of the tables in the relational database 220, a table for indexes of the tables in the relational database 220, and a table for references within the relational database. The metadata tables 250 may also include the additional columns that support the various aspects of the backup solution described herein. The additional columns may include versioning control columns and/or metadata columns.

After the backup system 210 obtains a snapshot of the SaaS Application 215 including the relational database 220, the backup system 210 may store data to the corresponding table in the backup database tables 235. As such, when data of a row of the table 230 is initially written to the table 235-b based on an obtained snapshot, the corresponding field in first versioning control column 240, which may be referred to as "birth snapshot" or "birthSN" column, may be written to include the version number of the snapshot from which the data is obtained. Additionally, when this data is initially obtained, the corresponding field in the second versioning control column 240, which may be referred to as the "death snapshot" or "deathSN" column, may be written to include a placeholder value (e.g., "−1") to indicate that the data is still live (e.g., has not been updated or deleted). When the data of the corresponding row is updated (or deleted) in the database table 230 of the source computing environment 205, the backup system 210 may update the corresponding field in the second versioning control column 245 to indicate that the data is no longer valid (e.g., the data is stale or dead) in the source computing environment 205 by adding a snapshot version number from which the backup system 210 determined that the data is updated or deleted in the source computing environment 205. That is, in the example described above, the field of the second versioning control column (e.g., deathSN) is updated from "−1" (indicating the data is live) to the version number of the recent snapshot (indicating that that data is invalid as of the snapshot version number). In the case that the data is updated, the backup system 210 adds a new row to the backup database table 235-b with the field in the first versioning control column indicating the new snapshot version from which the backup system determines that the data of the source computing environment 205 is updated and with the field of the second versioning control column 245 indicating that the data is live (e.g., "−1"). In this way, the backup system 210 does not delete or update data of rows in the backup database table but rather updates the versioning control columns and/or adds rows for updated data. This technique supports searching for data corresponding to different snapshots and restoring the SaaS Application 215 including the relational database 220 using a prior snapshot version (e.g., as data may not be deleted), as described herein.

As described herein and in further detail with respect to FIG. 3, the metadata tables 250 may also include respective versioning control columns that may be used similarly as described with respect to the backup data table 235-a. For example, as elements of the schema of the relational database are added, modified, and/or deleted, rows that describe the elements may be updated and/or added to describe the snapshot version which identified the added, modified, and/or or deleted element of the schema.

In some examples, the backup database tables 235 (e.g., the application data tables) have additional metadata columns that support various techniques described herein, such as searching, garbage collection, deduplication, security, and the like. For example, each of the backup database tables 235 may include the following columns:

```
    const
        birthInterSnapNumColName="z_birth_inter_snap_num"
    const
        birthIntraSnapNumColName="z_birth_intra_snap_num"
    const
        deathInterSnapNumColName="z_death_inter_snap_num"
    const
        deathIntraSnapNumColName="z_death_intra_snap_num"
    const birthDatetimeColName="z_birth_datetime"
    const deathDatetimeColName="z_death_datetime"
    const birthIsCreationColName="z_birth_is_creation"
    const deathIsDeletionColName="z_death_is_deletion"
    const rowSHA256ColName="z_row_sha256"
```

Each field in these columns describe aspects of the data of the corresponding row. For example, the "birthInterSnapNumColName" indicates the snapshot number from which the data of the row is obtained, and similarly, the "deathInterSnapNumColName" column indicates the snapshot number from which the data is deemed invalid (e.g., was deleted or changed). The "intra . . . " columns are similarly used for internal purposes by the backup system 210. For example, snapshot ingestion may be performed via multiple rounds internally such that multiple internal snapshots are used to ingest the data resulting in multiple internal saving points. These saving points may be used to roll-back updates within a snapshot and are used to monitor progress of snapshot ingestion. The birth and death "Datetime" columns may be used to support searching, as described in further detail herein. The fields of these "Datetime" columns may indicate dates/times which the data is stored and/or was deleted from the source computing environment 205 is obtained via a snapshot. These columns may support searching for data within a given time period. The "isCreation" column may be used to indicate that a row was added because a new row was added in the source computing environment. The "isDeletion" column may indicate that the corresponding row was deleted from the source application (e.g., rather than just an update to the data of the row). The "rowSHA256ColName" stores a hash value/key of the data of the row and may be used for garbage collection as described in further detail herein.

As described herein, the schema tables 250 describe the schema of the relational database 220. The schema may be a blueprint or structure that represents the logical configuration of the database. The schema may define how data is organized relationships among the data. The schema may provide a framework by specifying the type of data that can be stored in the database, the constraints on the data, and the relationships between the different tables and fields within the database. A schema may include at least the following definitions.

1. Tables: A table is the main form in which data is stored in a relational database and is made up of columns and rows. Each table has a name and is made up of fields or attributes that represent different types of data.
2. Fields: A field is a category of information that is stored in a table. Each field has a specific name and data type that dictates the kind of data it can store.
3. Records: Records or rows are individual entries in a table. Each record includes a unique identifier known as a primary key.

4. Relationships: These are logical connections between different tables. Relationships can be one-to-one, one-to-many, or many-to-many.
5. Indexes and keys: These are tools used to quickly locate and access data in a relational database. Keys are used to identify unique rows or records in a table, while indexes are used to retrieve data from the database more quickly than otherwise.

This arrangement describes the various aspects of data storage and allows for effective organization, manipulation, and retrieval of data. The schema is also used to enforce integrity constraints on the data, ensuring its accuracy and consistency.

FIG. 3 shows an example of a database table 300 that supports backup of aSaaS application with relational data in accordance with aspects of the present disclosure. The database table 300 may be an example of a metadata table 250 as described with respect to FIG. 2 and may include information that supports defining the schema of a relational database of a source computing environment, such as relational database 220 of FIG. 2. For example, the database table 300 describes various columns in the relational database, and as such, is a "snappable_schema_columns" table. Similar tables may be defined for indexes and relationships to support defining the schema of the relational database.

The database table 300 includes columns that are used to define the columns of the tables included in the SaaS application's relational database. As data from the relational database is ingested based on a snapshot, the columns of the metadata tables and the data included within may be defined. For example, the "ObjectType" column may define or indicate the table from which a column is obtained. In row 310-a, the column titled "Name" is a column in the "project" table of the relational database, the identifier for the column is "name-<uuid>," and the fields in the columns have a data type of "character varying (255)." Additionally, the default value for the fields in the Name column is empty text (e.g., " ").

As described with respect to FIG. 2, the backup system includes or adds versioning control columns 315 that describe snapshot data for the data within the database table 300. The first versioning control column 315-a (e.g., "birthSN") includes information that describes the snapshot version from which the column information was obtained. For example, for record or row 310-a, the column "Name" from the "project" object/table was identified from snapshot version V0. Thus, V0 is included in the first versioning control column 315-a for row 310-a. The second versioning control column 315-b (e.g., "deathSN") includes information that describes the snapshot version from which the column information was changed or deleted, and/or the second versioning control column 315-b includes information that indicates that the corresponding data is live or valid (e.g., has not be changed). Thus, for row 310-a, the field in second versioning control column 315-b includes a "−1" or a value that indicates that this column is still valid or used in the relational database. However, row 310-b, which describes a "Title" column in an "epic" object/table, includes "V2" in the second versioning control column. The "V2" value indicates that the data of the column is no longer valid as of snapshot version V2. That is, the "Title" column in the epic table was deleted or changed prior to snapshot version V2. If a new column of a table is detected via snapshot V3, then the backup system may add a new row in the table 300 with the column information and the field of the first versioning control column 315-a may include a value of V3.

As described with respect to FIG. 2, the application data tables of the backup system may include corresponding first versioning control columns 315-*a* and second versioning control columns 315-*b*. Thus, each portion of application data belongs to some snapshot number. Further, the backup system may maintain a mapping of snapshot version number and a schema version number that allows the backup system to identify the table schema that is used to hold the corresponding application data. Further, these techniques allow for the full history of the data of the relational database to be preserved as data is updated over time. More particularly, hard deletion or in-place modification of the data of the backup system is not supported. For example, when a row of a relational database is deleted, the backup system flips an internal flag of the row (e.g., updates the second versioning control column 315-*b*) to indicate that the row is "deleted" but the backup system maintains the record of the deleted data in the corresponding application data table. Additionally, when a row is modified, the corresponding row of the backup system is updated to indicate that the data is "stale" but a new row is inserted to document the new/updated data.

Additionally, the backup system may support recovery/ rollback of large volumes of data ingestion by using a write-ahead logging (WAL) technique such as to capture the changes that are to be made in the backup system in a dedicated table before making the changes to the corresponding tables in the backup system. Thus, in the event of an ingestion process crashing, by checking the WAL logging table, the backup system can identify the row where the crash occurred and where to resume the ingestion process. In the event of client requested rollback, the backup system applies the opposite of the operations captured in the WAL

```
func InSnappableIDs(snappableIDs [ ]uuid.UUID) inSnappableIDs {
    return inSnappableIDs{snappableIDs: snappableIDs}
}
```

LiveInSnapshots adds a filter to consider only objects live in ANY of the provided snapshots:

```
func LiveInSnapshots(snapshots [ ]int64) liveInSnapshots {
    return liveInSnapshots{snapshots: snapshots}
}
```

DeletedInSnapshots adds a filter to consider only objects for which the deletion happened in one of the provided snapshots:

```
func DeletedInSnapshots(snapshots [ ]int64) deletedInSnapshots {
    return deletedInSnapshots{snapshots: snapshots}
}
```

AddedInDuration adds a filter to consider only objects which were added during the given period. Start inclusive, end exclusive:

```
func AddedInDuration(startTime time.Time, endTime time.Time) addedInDuration
    return addedInDuration{startTime: startTime, endTime: endTime}
}
``` logging table. For example, if the logging table shows an addition of a particular row, the backup system deletes (soft delete) the row from the application data table, and if the LastModifiedInDuration adds a filter to consider only rows which were the last modified versions of an object during the given period. Start inclusive, end exclusive:

```
func LastModifiedInDuration(startTime time.Time, endTime time.Time)
lastModifiedInDuration {
    return lastModifiedInDuration{startTime: startTime, endTime: endTime}
}
``` logging table shows a soft-deletion of a particular row, then the backup system reverts the soft-deletion flag from the application data.

DeletedInDuration adds a filter to consider only objects which were deleted during the given period. Start inclusive, end exclusive:

```
func DeletedInDuration(startTime time.Time, endTime time.Time) deletedInDuration
{
    return deletedInDuration{startTime: startTime, endTime: endTime}
}
```

Moreover, the backup system provides an application programming interface (API) with a set of predefined searching predicates that allows an organization to use and identify information. Example predicates are as follows with "snappable IDs" corresponding to snapshot version numbers or another type of snapshot identifier:

InSnappableIDs adds a filter to search in the given snappable IDs:

IsLatestVersion adds a filter to get only the last live snapshots of the objects. This can be used to search across multiple snappables as well:

```
func IsLatestVersion( ) isLatestVersion {
    return isLatestVersion{ }
}
```

LiveInAnySnapshots lists the live objects across all snapshots:

```
func LiveInAnySnapshots( ) liveInAnySnapshots {
    return liveInAnySnapshots{ }
}
```

DeletedInAnySnapshots lists all the deleted objects across all snapshots:

```
func DeletedInAnySnapshots( ) deletedInAnySnapshots {
    return deletedInAnySnapshots{ }
}
```

Additionally, the backup system may support cascading search support. Using native table joining capacity of relational databases, any number of application data tables may be joined. Further, since the data are all versioned by snapshot version number, querying a difference between snapshot S1 and snapshot Sn is includes obtaining all the changes associated with snapshot S2, S3, . . . , and Sn.

The backup system may also support non-relational data in a non-relational data store of the backup system. For example, the backup system may introduce a data type (e.g., ZBlob) that may be used for a column. For such a column, the content may be stored in the non-relational data store and a reference to the data may be stored in the column as if the reference is content. A deferred API may be used to fetch the corresponding data when requested.

As described herein, the data of the application data tables may include additional metadata columns. One of the columns may store hash values/keys of the data within the row. For example, each application data table has a column named z__row_sha256, which is a hash value of all columns in sorted order. The hash value may be used to determine if a row has already been stored in the table and does not require insertion into the table. Additionally, the backup system may periodically scan to perform garbage collection for old data. For data that is old, the data may be deleted (e.g., if a snapshot version is deprecated).

The backup system may also include multi-tenancy support. For example, one database may be used to hold data for one tenant's data. Tenants with small (e.g., relative to amount of CPU and storage supported by a database instance) amount of data, the tenant data is co-located with databases with other tenant data. Each of the databases still runs independently without being impacted by others. The backup system may additionally support automatic scaling as data grows. As the backup system may be implemented in a cloud environment, the cloud environment may be configured to automatically scale to support increased loads, such as by increasing memory and storage capacity and CPU capacity. The cloud environment may also be used to spin up database replicas of the backup database tables. The backup system may additionally support in-transit and at-rest encryption. Data may be transmitted via HTTPS protocol (or another data transfer protocol) that provides native encryption to avoid or prevent data leak between different transportation points. The cloud environment may support PostgreSQL to provide platform-managed encryption key (PMK) that is used to encrypt the database files when stored in the cloud environment data center. The backup system may also include bring-your-own-key (BYOK) support to allow tenants to provide encryption keys that are in tenant control, and the key may be used to encrypt the data when stored in the backup system. Moreover, the backup system may include restricted column based RBAC to avoid application data mutation. The backup system may revoke the data deletion permission for database users so no data will be deleted (except for data garbage collection purposes). Column edit permissions may be revoked for all application data columns (i.e., columns that hold data from tenants), so users are unable to modify the application data. This way, all the applications data become immutable once captured in the backup system.

The backup system may support Self-driven metadata schema upgrades by saving a metadata schema in the source code in a versioned, immutable data structure. A program may continuously reconcile the database's actual metadata version to the desired one. This supports efficient upgrades to the metadata schema for the database instances without manual effort.

Figure 4:
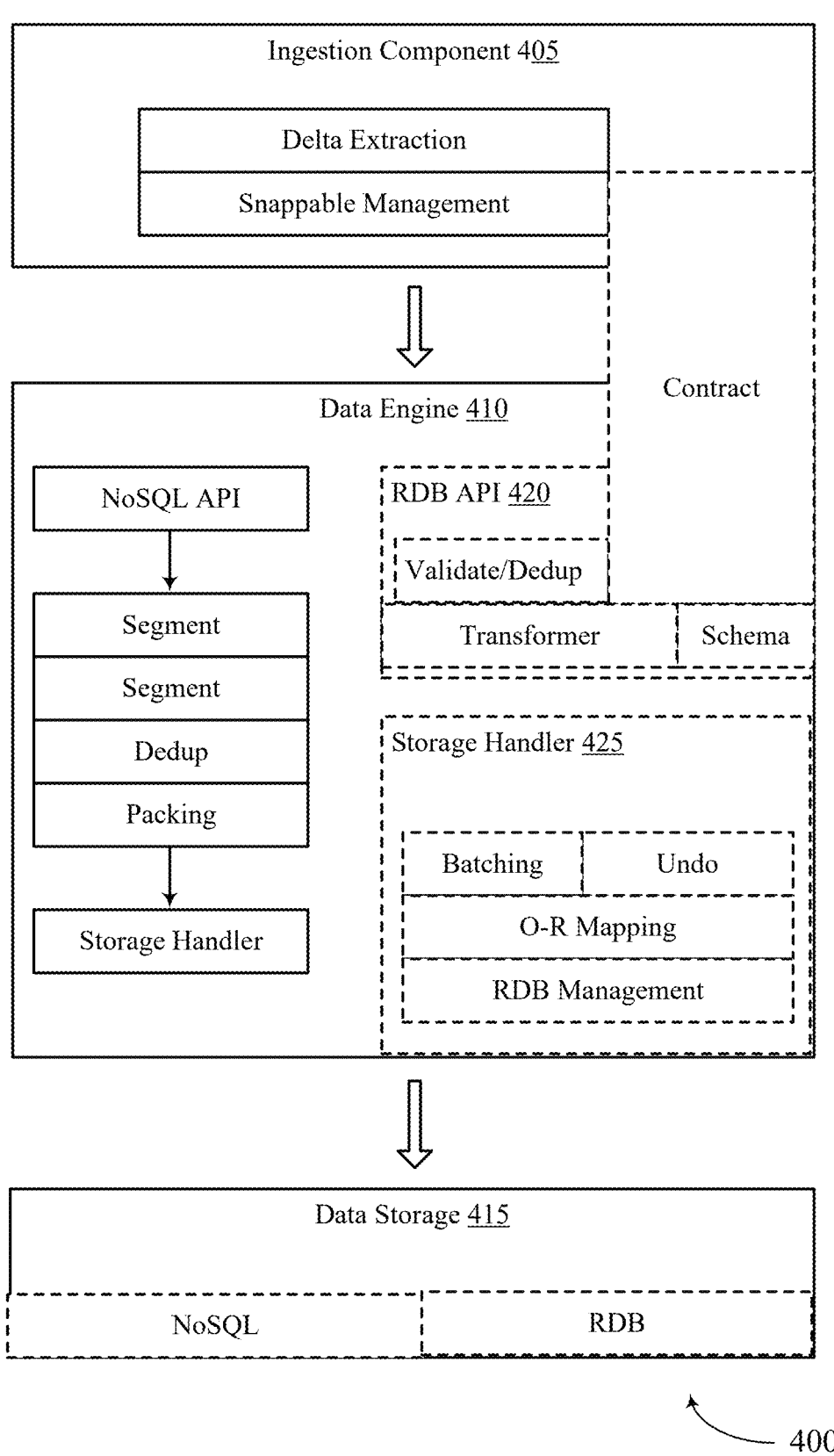
FIG. 4 shows an example of a computing architecture that supports backup of a SaaS application with relational data in accordance with aspects of the present disclosure.

FIG. 4 shows an example of a computing architecture 400 that supports backup of a SaaS application with relational data in accordance with aspects of the present disclosure. The computing architecture 400 includes a ingestion component 405, a data engine 410, and data storage 415. The ingestion component 405 may interface with a source computing environment (e.g., source computing environment 205 as described with respect to FIG. 2) to support snapshot ingestion and management. The ingestion component 405, the data engine 410, and/or the data storage 415 may be implemented in a backup system 210 as described with respect to FIG. 2.

A relational database (RDB) API 420 may be used to support various techniques described herein. For example, the RDB API 420 supports data validation and deduplication, data transformation, and schema identification. For example, a source computing environment has a specific column name in the source relational database, but the name may not be usable in the backup system. As such, the transformer may be used to translate source data and backup data. The schema component may store information associated with the schema of the backup database tables. In another example, the transformation component may support a column renaming capability. As described herein, the backup system may include immutable column names and a same name may not be reused. In such cases, columns (e.g., from different tables) in the source computing environment may have the same name or the source application may add a column with the same name (e.g., having different data types). To handle such scenarios, the translation layer may support having column aliases to translate and differentiate between column names.

A storage handler 425 of the data engine 410 may include components to support various storage techniques described herein. A RDB management layer different underlying database implementation (e.g., Postgres or MySQL). An object model to relational model (O-R) mapping layer may be used to generate SQL statements based on application requirements. The storage handler 425 may include batching and undo operations. The data storage 415 may include NoSQL storage to store non-relational data, and the RDB that includes the backup database tables and the metadata tables, as described herein. The NoSQL API pipeline of the data engine 410 supports storage and management of the non-relational data obtained from the source computing environment.

Figure 5:
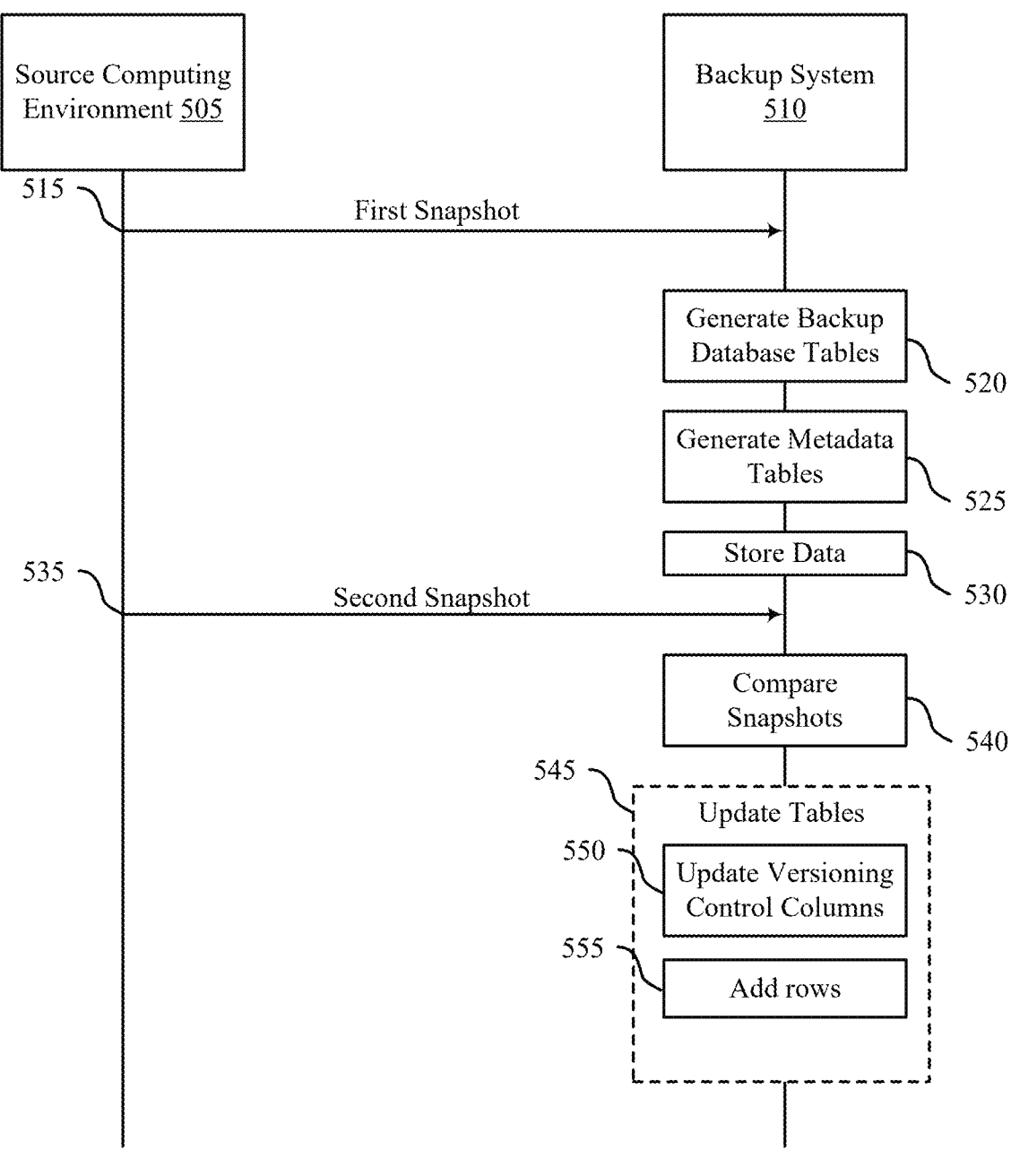
FIG. 5 shows an example of a process flow that supports backup of a SaaS application with relational data in accordance with aspects of the present disclosure.

FIG. 5 shows an example of a process flow 500 that supports backup of a SaaS application with relational data in accordance with aspects of the present disclosure. The process flow 500 includes a source computing environment

505 and a backup system 510, which may be examples of the corresponding devices or systems as described with respect to FIGS. 1 through 4. For example, the source computing environment may represent or include one or more servers that support a SaaS application with relational data, as described herein. In the following description of the process flow 500, operations may be added, omitted, or performed in a different order (with respect to the exemplary order shown).

At 515, the backup system 510 may obtain a first snapshot of a SaaS application including relational data (e.g., in a relational database) of the source computing environment 505. The first snapshot may be the first snapshot of the relational database (e.g., the relational data of the SaaS application) of the source computing environment. In such cases, at 520, the backup system 510 may generate a set of backup database tables. Each backup database table may be associated with a respective source database table of the relational database of the source computing environment 505. At 525, the backup system 510 may generate a set of metadata tables that describe a schema of the relational database of the source computing environment 505. The set of backup database tables and the set of metadata tables may include respective first versioning control columns and respective second versioning control columns; At 530, the backup system 510 may store the copies of the data of the relational database and store data describing the schema in the metadata tables. Additionally, the backup system may update the first versioning control columns in the backup database tables and the metadata tables to indicate that the corresponding data was captured via the first snapshot. For example, in the case of the first snapshot being the first snapshot of the relational database, the first versioning control columns may include values that indicate "V0" such as to indicate the first snapshot. The fields of the second versioning control columns may include values that indicate that the corresponding data is live. For example, the second versioning control columns may indicate "−1" to indicate that the data is live.

At 535, the backup system 510 may obtain a new snapshot (e.g., second snapshot) of the relational database of the source computing environment 505. At 540, the backup system 510 may compare the new snapshot of the relational database to a prior snapshot of the relational database. At 545, the backup system 510 may update the backup database tables and/or the metadata tables based on the comparison. For example, at 550, the backup system 510 may update, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot (e.g., the second versioning control column is changed from "−1" to "V1"). At 555, the backup system 510 may add, in response to the comparison indicating that the data of the row of the relational database table changed, an additional row to the corresponding backup database table, wherein a field of the respective first versioning control column of the additional row includes an indication of the version of the new snapshot. Thus, the first versioning control column of the new row may include "V1" to indicate the new snapshot from which the changed data is identified.

In some cases, at 545, the backup system 510 may update, in response to the comparison indicating that the schema of the relational database has changed between the prior snapshot and the new snapshot, a corresponding metadata table of the set of metadata tables to indicate that the schema has changed. In the case that the comparison indicates modification to an element of the schema, updating the corresponding metadata table may include updating the field of the respective second versioning control column of a second row corresponding to the element in the corresponding metadata table to indicate the version of the new snapshot. In this case, updating the tables may include adding a second additional row to the corresponding metadata table, wherein the field of the respective first versioning control column of the second additional row comprises the indication of the version of the new snapshot. In the case that the comparison indicates an addition of an element of the schema, then updating the tables may include adding, in response to the comparison indicating that the addition of the element, a second additional row to the corresponding metadata table, wherein the field of the respective first versioning control column of the second additional row comprises the indication of the version of the new snapshot. In a case where the comparison indicates deletion of an element of the schema, updating the tables may include updating the field of a second row corresponding to the element in the corresponding metadata table to indicate the version of the new snapshot.

As such, the respective first versioning control columns of the backup system 510 include first fields that each indicate a respective first snapshot version in which data of the corresponding row was created or modified, and the respective second versioning control columns include second fields that each indicate a respective second snapshot version in which data of the corresponding row is rendered stale (e.g., "V1") or that indicates that the data of the corresponding row is active (e.g., "−1"). Further, as described herein, the set of metadata tables may include columns table that includes indications of columns of tables within the relational database, an indexes table that includes indications of indexes within the relational database, and a references table that includes indications of references within the relational database, or a combination thereof. Additionally, each backup database table of the set of backup database tables may include a hash column that includes hash values resulting from a hash of each row of the backup database table. The hash values may support deduplication of data in the backup database table. In some cases, the each backup database table of the set of backup database tables may include a set of backup metadata columns including information that is indicative of whether data of a respective row is added at a first time, whether the data of the respective row is to be deleted at a second time, whether the data of the respective row was updated at a third time, whether the data of the respective row was deleted at a fourth time, or a combination thereof.

In some examples, the backup system 510 may store a mapping of a snapshot version number of the schema of the relational database to a snapshot version number of data of the relational database. Each row of the set of backup database tables may reference the snapshot version number of data of the relational database. The backup system 510 may also provide, via an API for the backup system, a set of search predicates that provide a set of filters for identifying data within one or more snapshots as stored in the backup system.

Figure 6:
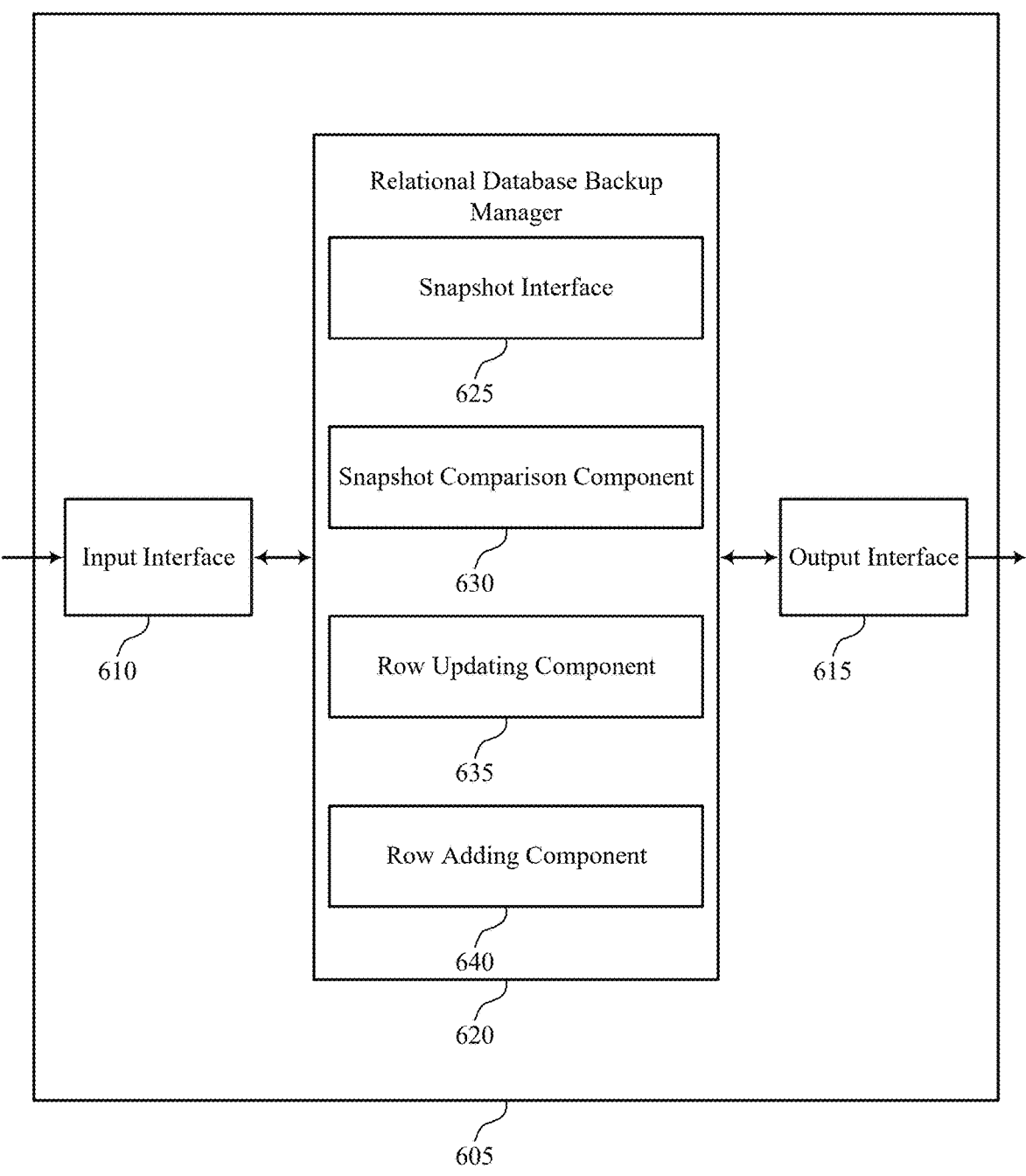
FIG. 6 shows a block diagram of an apparatus that supports backup of a SaaS application with relational data in accordance with aspects of the present disclosure.

FIG. 6 shows a block diagram 600 of a system 605 that supports backup of a SaaS application with relational data in accordance with aspects of the present disclosure. In some examples, the system 605 may be an example of aspects of one or more components described with reference to FIG. 1, such as a DMS 110. The system 605 may include an input interface 610, an output interface 615, and a relational SaaS application backup manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the relational SaaS application backup manager 620 to support backup of a SaaS application with relational data. In some cases, the input interface 610 may be a component of a network interface 825 as described with reference to FIG. 8.

The output interface 615 may manage output signaling for the system 605. For example, the output interface 615 may receive signaling from other components of the system 605, such as the relational SaaS application backup manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the relational SaaS application backup manager 620 may include a snapshot interface 625, a snapshot comparison component 630, a row updating component 635, a row adding component 640, or any combination thereof. In some examples, the relational SaaS application backup manager 620, or various components thereof, may be configured to perform various operations (e.g., receiving, monitoring, transmitting) using or otherwise in cooperation with the input interface 610, the output interface 615, or both. For example, the relational SaaS application backup manager 620 may receive information from the input interface 610, send information to the output interface 615, or be integrated in combination with the input interface 610, the output interface 615, or both to receive information, transmit information, or perform various other operations as described herein.

The snapshot interface 625 may be configured as or otherwise support a means for obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns. The snapshot comparison component 630 may be configured as or otherwise support a means for comparing the new snapshot of the relational database to a prior snapshot of the relational database. The row updating component 635 may be configured as or otherwise support a means for updating, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot. The row adding component 640 may be configured as or otherwise support a means for adding, in response to the comparison indicating that the data of the row of the relational database table changed, an additional row to the corresponding backup database table, where a field of the respective first versioning control column of the additional row includes an indication of the version of the new snapshot.

Figure 7:
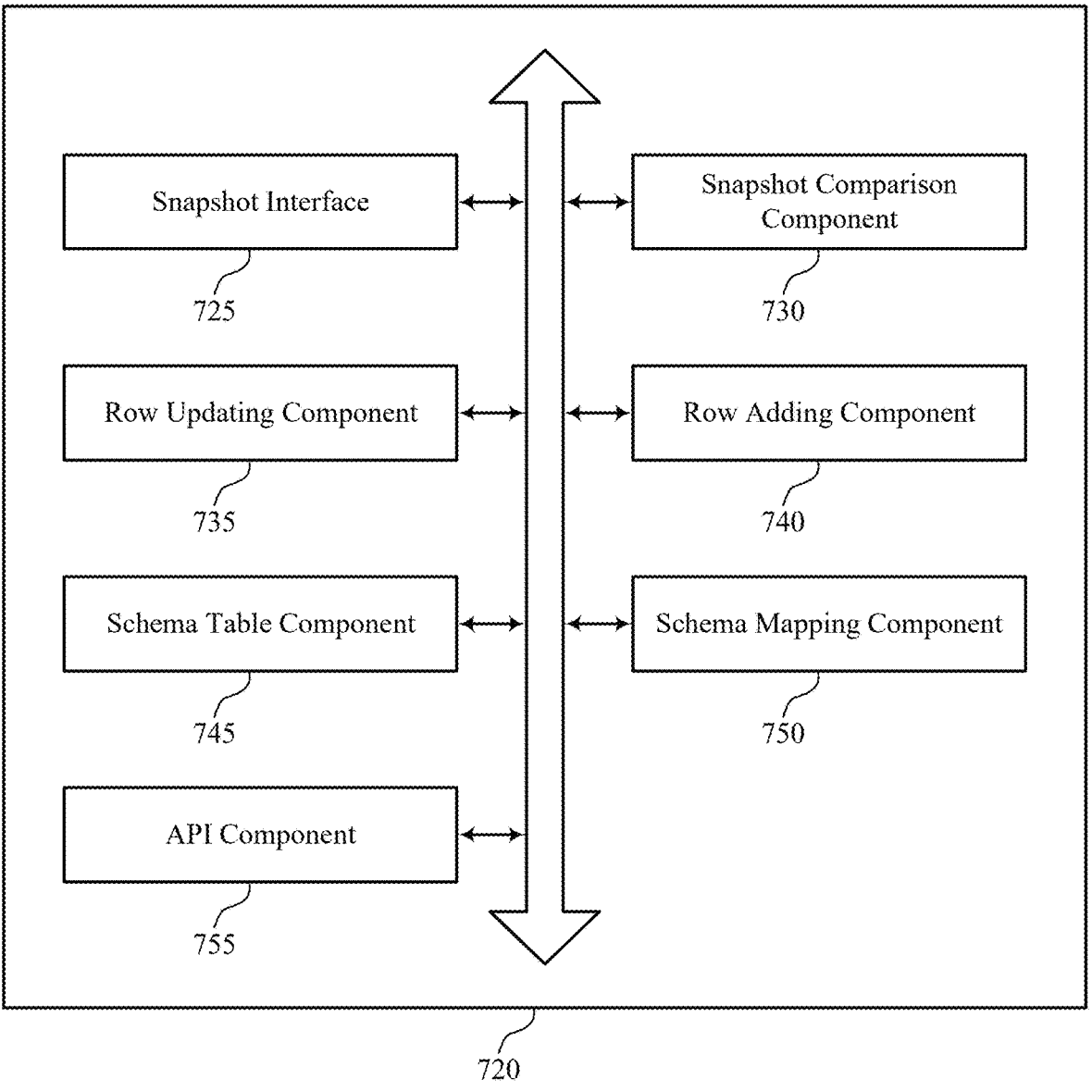
FIG. 7 shows a block diagram of a relational database backup manager that supports backup of a SaaS application with relational data in accordance with aspects of the present disclosure.

FIG. 7 shows a block diagram 700 of a relational SaaS application backup manager 720 that supports backup of a SaaS application with relational data in accordance with aspects of the present disclosure. The relational SaaS application backup manager 720 may be an example of aspects of a relational database backup manager or a relational SaaS application backup manager 620, or both, as described herein. The relational SaaS application backup manager 720, or various components thereof, may be an example of means for performing various aspects of backup of a SaaS application with relational data as described herein. For example, the relational SaaS application backup manager 720 may include a snapshot interface 725, a snapshot comparison component 730, a row updating component 735, a row adding component 740, a schema table component 745, a schema mapping component 750, an API component 755, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot interface 725 may be configured as or otherwise support a means for obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns. The snapshot comparison component 730 may be configured as or otherwise support a means for comparing the new snapshot of the relational database to a prior snapshot of the relational database. The row updating component 735 may be configured as or otherwise support a means for updating, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot. The row adding component 740 may be configured as or otherwise support a means for adding, in response to the comparison indicating that the data of the row of the relational database table changed, an additional row to the corresponding backup database table, where a field of the respective first versioning control column of the additional row includes an indication of the version of the new snapshot.

In some examples, the field of the respective second versioning control column of the additional row includes an indication that the data of the additional row is live data in the relational database.

In some examples, the respective first versioning control columns include first fields that each indicate a respective first snapshot version in which data of the corresponding row was created or modified. In some examples, the respective second versioning control columns include second fields that each indicate a respective second snapshot version in which data of the corresponding row is rendered stale or that indicates that the data of the corresponding row is active.

In some examples, the schema table component 745 may be configured as or otherwise support a means for updating, in response to the comparison indicating that the schema of the relational database has changed between the prior snapshot and the new snapshot, a corresponding metadata table of the set of metadata tables to indicate that the schema has changed.

In some examples, to support updating the corresponding metadata table, the row updating component 735 may be configured as or otherwise support a means for updating the field of the respective second versioning control column of a second row corresponding to the element in the corresponding metadata table to indicate the version of the new snapshot. In some examples, to support updating the corresponding metadata table, the row adding component 740 may be configured as or otherwise support a means for adding a second additional row to the corresponding metadata table, where the field of the respective first versioning control column of the second additional row includes the indication of the version of the new snapshot.

In some examples, to support updating the corresponding metadata table, the row adding component 740 may be configured as or otherwise support a means for adding, in response to the comparison indicating that the addition of the element, a second additional row to the corresponding metadata table, where the field of the respective first versioning control column of the second additional row includes the indication of the version of the new snapshot.

In some examples, to support updating the corresponding metadata table, the row updating component 735 may be configured as or otherwise support a means for updating the field of a second row corresponding to the element in the corresponding metadata table to indicate the version of the new snapshot.

In some examples, the set of metadata tables includes a columns table that includes indications of columns of tables within the relational database, an indexes table that includes indications of indexes within the relational database, and a references table that includes indications of references within the relational database, or a combination thereof.

In some examples, each backup database table of the set of backup database tables includes a hash column that includes hash values resulting from a hash of each row of the backup database table. In some examples, the hash values support deduplication of data in the backup database table.

In some examples, each backup database table of the set of backup database tables includes a set of backup metadata columns including information that is indicative of whether data of a respective row is added at a first time, whether the data of the respective row is to be deleted at a second time, whether the data of the respective row was updated at a third time, whether the data of the respective row was deleted at a fourth time, or a combination thereof.

In some examples, the schema mapping component 755 may be configured as or otherwise support a means for storing a mapping of a snapshot version number of the schema of the relational database to a snapshot version number of data of the relational database, and where each row of the set of backup database tables references the snapshot version number of data of the relational database.

In some examples, the API component 755 may be configured as or otherwise support a means for providing, via an application programming interface (API) for the backup system, a set of search predicates that provide a set of filters for identifying data within one or more snapshots as stored in the backup system.

Figure 8:
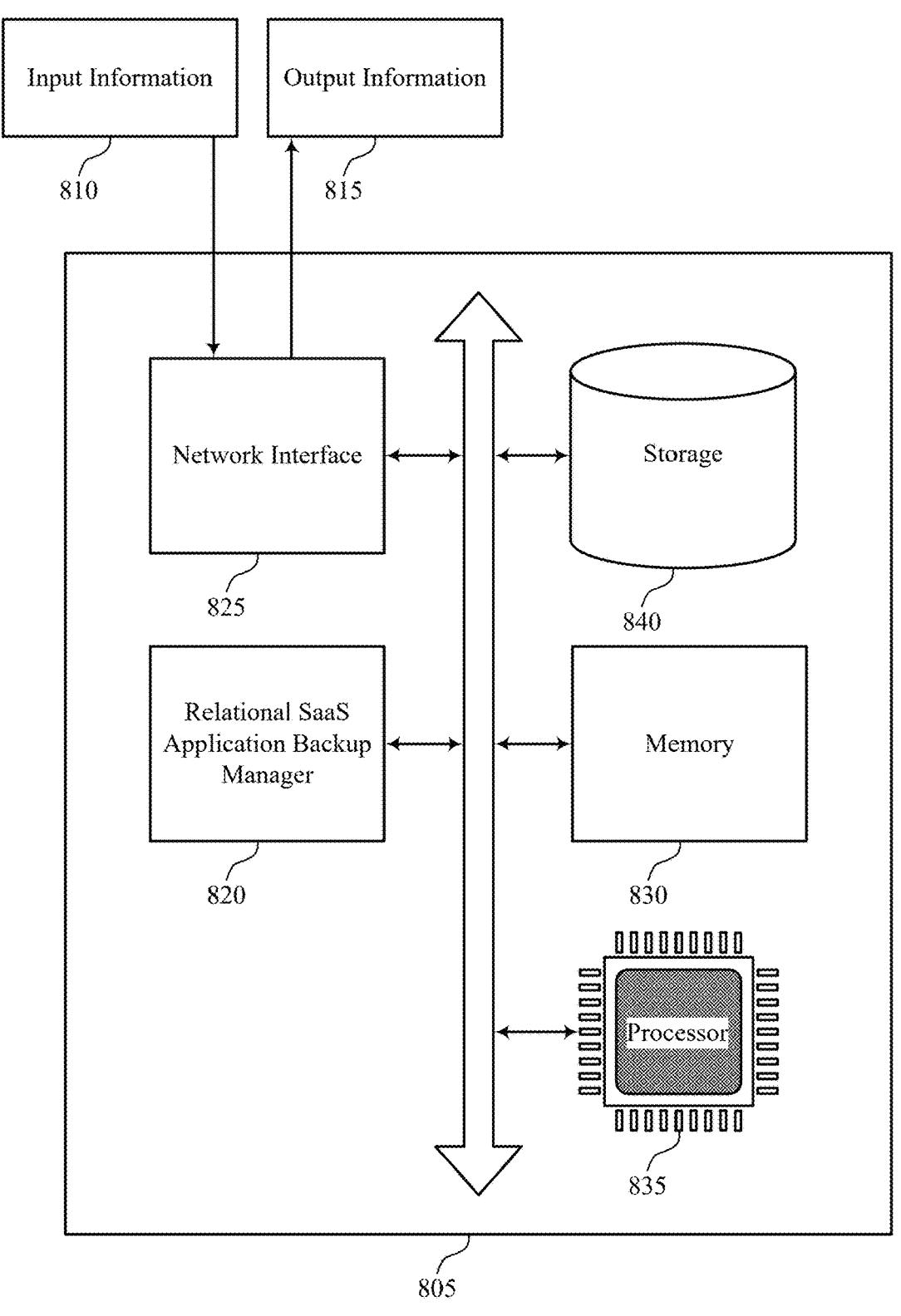
FIG. 8 shows a diagram of a system including a device that supports backup of a SaaS application with relational data in accordance with aspects of the present disclosure.

FIG. 8 shows a block diagram 800 of a system 805 that supports backup of a SaaS application with relational data in accordance with aspects of the present disclosure. The system 805 may be an example of or include components of a system 605 as described herein. The system 805 may include components for data management, including components such as a relational SaaS application backup manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting backup of a SaaS application with relational data). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor

835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the relational SaaS application backup manager 820 may be configured as or otherwise support a means for obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns. The relational SaaS application backup manager 820 may be configured as or otherwise support a means for comparing the new snapshot of the relational database to a prior snapshot of the relational database. The relational SaaS application backup manager 820 may be configured as or otherwise support a means for updating, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot. The relational SaaS application backup manager 820 may be configured as or otherwise support a means for adding, in response to the comparison indicating that the data of the row of the relational database table changed, an additional row to the corresponding backup database table, where a field of the respective first versioning control column of the additional row includes an indication of the version of the new snapshot.

By including or configuring the relational SaaS application backup manager 820 in accordance with examples as described herein, the system 805 may support techniques for backup of a SaaS application with relational data, which may provide one or more benefits such as, for example, improved data backup management including improved backup searching, production rollback, and versioning control, among other possibilities.

FIG. 9 shows a flowchart illustrating a method 900 that supports backup of a SaaS application with relational data in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns. The operations of 905 may be performed in accordance with examples as disclosed herein. In some examples, aspects of the operations of 905 may be performed by a snapshot interface 725 as described with reference to FIG. 7.

At 910, the method may include comparing the new snapshot of the relational database to a prior snapshot of the relational database. The operations of 910 may be performed in accordance with examples as disclosed herein. In some examples, aspects of the operations of 910 may be performed by a snapshot comparison component 730 as described with reference to FIG. 7.

At 915, the method may include updating, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot. The operations of 915 may be performed in accordance with examples as disclosed herein. In some examples, aspects of the operations of 915 may be performed by a row updating component 735 as described with reference to FIG. 7.

At 920, the method may include adding, in response to the comparison indicating that the data of the row of the relational database table changed, an additional row to the corresponding backup database table, where a field of the respective first versioning control column of the additional row includes an indication of the version of the new snapshot. The operations of 920 may be performed in accordance with examples as disclosed herein. In some examples, aspects of the operations of 920 may be performed by a row adding component 740 as described with reference to FIG. 7.

FIG. 10 shows a flowchart illustrating a method 1000 that supports backup of a SaaS application with relational data in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns. The operations of 1005 may be performed in accordance with examples as disclosed herein. In some examples, aspects of the operations of 1005 may be performed by a snapshot interface 725 as described with reference to FIG. 7.

At 1010, the method may include comparing the new snapshot of the relational database to a prior snapshot of the relational database. The operations of 1010 may be performed in accordance with examples as disclosed herein. In some examples, aspects of the operations of 1010 may be performed by a snapshot comparison component 730 as described with reference to FIG. 7.

At 1015, the method may include updating, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot. The operations of 1015 may be performed in accordance with examples as disclosed herein. In some examples, aspects of the operations of 1015 may be performed by a row updating component 735 as described with reference to FIG. 7.

At 1020, the method may include adding, in response to the comparison indicating that the data of the row of the relational database table changed, an additional row to the corresponding backup database table, where a field of the respective first versioning control column of the additional row includes an indication of the version of the new snapshot. The operations of 1020 may be performed in accordance with examples as disclosed herein. In some examples, aspects of the operations of 1020 may be performed by a row adding component 740 as described with reference to FIG. 7.

At 1025, the method may include updating, in response to the comparison indicating that the schema of the relational database has changed between the prior snapshot and the new snapshot, a corresponding metadata table of the set of metadata tables to indicate that the schema has changed. The operations of 1025 may be performed in accordance with examples as disclosed herein. In some examples, aspects of the operations of 1025 may be performed by a schema table component 745 as described with reference to FIG. 7.

FIG. 11 shows a flowchart illustrating a method 1100 that supports backup of a SaaS application with relational data in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns. The operations of 1105 may be performed in accordance with examples as disclosed herein. In some examples, aspects of the operations of 1105 may be performed by a snapshot interface 725 as described with reference to FIG. 7.

At 1110, the method may include comparing the new snapshot of the relational database to a prior snapshot of the relational database. The operations of 1110 may be performed in accordance with examples as disclosed herein. In some examples, aspects of the operations of 1110 may be performed by a snapshot comparison component 730 as described with reference to FIG. 7.

At 1115, the method may include updating, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot. The operations of 1115 may be performed in accordance with examples as disclosed herein. In some examples, aspects of the operations of 1115 may be performed by a row updating component 735 as described with reference to FIG. 7.

At 1120, the method may include adding, in response to the comparison indicating that the data of the row of the relational database table changed, an additional row to the corresponding backup database table, where a field of the respective first versioning control column of the additional row includes an indication of the version of the new snapshot. The operations of 1120 may be performed in accordance with examples as disclosed herein. In some examples, aspects of the operations of 1120 may be performed by a row adding component 740 as described with reference to FIG. 7.

At 1125, the method may include updating, in response to the comparison indicating that the schema of the relational database has changed between the prior snapshot and the new snapshot, a corresponding metadata table of the set of metadata tables to indicate that the schema has changed. The operations of 1125 may be performed in accordance with examples as disclosed herein. In some examples, aspects of the operations of 1125 may be performed by a schema table component 745 as described with reference to FIG. 7.

At 1130, the method may include updating the field of the respective second versioning control column of a second row corresponding to the element in the corresponding metadata table to indicate the version of the new snapshot. The operations of 1130 may be performed in accordance with examples as disclosed herein. In some examples, aspects of the operations of 1130 may be performed by a row updating component 735 as described with reference to FIG. 7.

At 1135, the method may include adding a second additional row to the corresponding metadata table, where the field of the respective first versioning control column of the second additional row includes the indication of the version of the new snapshot. The operations of 1135 may be performed in accordance with examples as disclosed herein. In some examples, aspects of the operations of 1135 may be performed by a row adding component 740 as described with reference to FIG. 7.

A method by an apparatus is described. The method may include obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns, comparing the new snapshot of the relational database to a prior snapshot of the relational database, updating, in response to the comparison indicating that data of a row of a relational database table of the relational database changed between the prior snapshot and the new snapshot, a field of the respective second versioning control column of a cor- responding row of a corresponding backup database table of the set of backup database tables to indicate a version of the new snapshot, and adding, in response to the comparison indicating that the data of the row of the relational database table changed, an additional row to the corresponding backup database table, where a field of the respective first versioning control column of the additional row includes an indication of the version of the new snapshot.

An apparatus is described. The apparatus may include one or more memories storing processor executable code, and one or more processors coupled with the one or more memories. The one or more processors may individually or collectively be operable to execute the code to cause the apparatus to obtain, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup database tables and the set of metadata tables include respective first versioning control columns and respective second versioning control columns, compare the new snapshot of the relational database to a prior snapshot of the relational database, update, in response to the comparison indicating that data of a row of a relational database table of the relational database changed between the prior snapshot and the new snapshot, a field of the respective second versioning control column of a corre- sponding row of a corresponding backup database table of the set of backup database tables to indicate a version of the new snapshot, and add, in response to the comparison indicating that the data of the row of the relational database table changed, an additional row to the corresponding backup database table, where a field of the respective first versioning control column of the additional row includes an indication of the version of the new snapshot.

Another apparatus is described. The apparatus may include means for obtaining, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup data- base tables and the set of metadata tables include respective first versioning control columns and respective second ver- sioning control columns, means for comparing the new snapshot of the relational database to a prior snapshot of the relational database, means for updating, in response to the comparison indicating that data of a row of a relational database table of the relational database changed between the prior snapshot and the new snapshot, a field of the respective second versioning control column of a corre- sponding row of a corresponding backup database table of the set of backup database tables to indicate a version of the new snapshot, and means for adding, in response to the comparison indicating that the data of the row of the relational database table changed, an additional row to the corresponding backup database table, where a field of the respective first versioning control column of the additional row includes an indication of the version of the new snap- shot.

A non-transitory computer-readable medium storing code is described. The code may include instructions executable by one or more processors to obtain, at a backup system, a new snapshot of a relational database of a source computing environment, where the backup system includes a set of backup database tables associated with a set of source database tables of the relational database of the source computing environment and a set of metadata tables that describe a schema of the relational database of the source computing environment, and where the set of backup data- base tables and the set of metadata tables include respective first versioning control columns and respective second ver- sioning control columns, compare the new snapshot of the relational database to a prior snapshot of the relational database, update, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot, and add, in response to the comparison indicating that the data of the row of the relational database table changed, an additional row to the corresponding backup database table, where a field of the respective first versioning control column of the additional row includes an indication of the version of the new snap- shot.

In some examples of the method, apparatus, and non- transitory computer-readable medium described herein, the field of the respective second versioning control column of the additional row includes an indication that the data of the additional row may be live data in the relational database.

In some examples of the method, apparatus, and non- transitory computer-readable medium described herein, the respective first versioning control columns include first fields that each indicate a respective first snapshot version in which data of the corresponding row was created or modi- fied and the respective second versioning control columns include second fields that each indicate a respective second snapshot version in which data of the corresponding row may be rendered stale or that indicates that the data of the corresponding row may be active.

Some examples of the method, apparatus, and non-tran- sitory computer-readable medium described herein may further include operations, features, means, or instructions for updating, in response to the comparison indicating that the schema of the relational database may have changed between the prior snapshot and the new snapshot, a corre- sponding metadata table of the set of metadata tables to indicate that the schema may have changed.

In some examples of the method, apparatus, and non- transitory computer-readable medium described herein, updating the corresponding metadata table may include operations, features, means, or instructions for updating the field of the respective second versioning control column of a second row corresponding to the element in the corre- sponding metadata table to indicate the version of the new snapshot and adding a second additional row to the corre- sponding metadata table, where the field of the respective first versioning control column of the second additional row includes the indication of the version of the new snapshot.

In some examples of the method, apparatus, and non-transitory computer-readable medium described herein, updating the corresponding metadata table may include operations, features, means, or instructions for adding, in response to the comparison indicating that the addition of the element, a second additional row to the corresponding metadata table, where the field of the respective first versioning control column of the second additional row includes the indication of the version of the new snapshot.

In some examples of the method, apparatus, and non-transitory computer-readable medium described herein, updating the corresponding metadata table may include operations, features, means, or instructions for updating the field of a second row corresponding to the element in the corresponding metadata table to indicate the version of the new snapshot.

In some examples of the method, apparatus, and non-transitory computer-readable medium described herein, the set of metadata tables includes a columns table that includes indications of columns of tables within the relational database, an indexes table that includes indications of indexes within the relational database, and a references table that includes indications of references within the relational database, or a combination thereof.

In some examples of the method, apparatus, and non-transitory computer-readable medium described herein, each backup database table of the set of backup database tables includes a hash column that includes hash values resulting from a hash of each row of the backup database table and the hash values supports deduplication of data in the backup database table.

In some examples of the method, apparatus, and non-transitory computer-readable medium described herein, each backup database table of the set of backup database tables includes a set of backup metadata columns including information that may be indicative of whether data of a respective row may be added at a first time, whether the data of the respective row is to be deleted at a second time, whether the data of the respective row was updated at a third time, whether the data of the respective row was deleted at a fourth time, or a combination thereof.

Some examples of the method, apparatus, and non-transitory computer-readable medium described herein may further include operations, features, means, or instructions for storing a mapping of a snapshot version number of the schema of the relational database to a snapshot version number of data of the relational database, and where each row of the set of backup database tables references the snapshot version number of data of the relational database.

In some examples of the method, apparatus, and non-transitory computer-readable medium described herein, providing, via an application programming interface (API) for the backup system, a set of search predicates that provide a set of filters for identifying data within one or more snapshots as stored in the backup system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
obtaining, at a backup system, a new snapshot of a relational database of a source computing environment, wherein the backup system comprises:
a set of backup database tables associated with a set of source database tables of the relational database of the source computing environment, and
a set of metadata tables that describe a schema of the relational database of the source computing environment, and wherein the set of backup database tables and the set of metadata tables comprise respective first versioning control columns and respective second versioning control columns;
comparing the new snapshot of the relational database to a prior snapshot of the relational database;
updating, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot; and
adding, in response to the comparison indicating that the data of the row of the relational database table changed, an additional row to the corresponding backup database table, wherein a field of the respective first versioning control column of the additional row comprises an indication of the version of the new snapshot.

2. The method of claim 1, wherein the field of the respective second versioning control column of the additional row includes an indication that the data of the additional row is live data in the relational database.

3. The method of claim 1, wherein:
the respective first versioning control columns comprise first fields that each indicate a respective first snapshot version in which data of the corresponding row was created or modified; and
the respective second versioning control columns comprise second fields that each indicate a respective second snapshot version in which data of the corresponding row is rendered stale or that indicates that the data of the corresponding row is active.

4. The method of claim 1, further comprising:
updating, in response to the comparison indicating that the schema of the relational database has changed between the prior snapshot and the new snapshot, a corresponding metadata table of the set of metadata tables to indicate that the schema has changed.

5. The method of claim 4, wherein the comparison indicates modification to an element of the schema and wherein updating the corresponding metadata table comprises:
updating the field of the respective second versioning control column of a second row corresponding to the element in the corresponding metadata table to indicate the version of the new snapshot; and
adding a second additional row to the corresponding metadata table, wherein the field of the respective first versioning control column of the second additional row comprises the indication of the version of the new snapshot.

6. The method of claim 4, wherein the comparison indicates an addition of an element of the schema and wherein updating the corresponding metadata table comprises:
adding, in response to the comparison indicating that the addition of the element, a second additional row to the corresponding metadata table, wherein the field of the respective first versioning control column of the second additional row comprises the indication of the version of the new snapshot.

7. The method of claim 4, wherein the comparison indicates a deletion of an element of the schema and wherein updating the corresponding metadata table comprises:
updating the field of a second row corresponding to the element in the corresponding metadata table to indicate the version of the new snapshot.

8. The method of claim 1, wherein the set of metadata tables comprises a columns table that includes indications of columns of tables within the relational database, an indexes table that includes indications of indexes within the relational database, and a references table that includes indications of references within the relational database, or a combination thereof.

9. The method of claim 1, wherein:

each backup database table of the set of backup database tables comprises a hash column that includes hash values resulting from a hash of each row of the backup database table, and the hash values support deduplication of data in the backup database table.

10. The method of claim 1, wherein each backup database table of the set of backup database tables comprises a set of backup metadata columns including information that is indicative of whether data of a respective row is added at a first time, whether the data of the respective row is to be deleted at a second time, whether the data of the respective row was updated at a third time, whether the data of the respective row was deleted at a fourth time, or a combination thereof.

11. The method of claim 1, further comprising:

storing a mapping of a snapshot version number of the schema of the relational database to a snapshot version number of data of the relational database, and wherein each row of the set of backup database tables references the snapshot version number of data of the relational database.

12. The method of claim 1, further comprising:

providing, via an application programming interface (API) for the backup system, a set of search predicates that provide a set of filters for identifying data within one or more snapshots as stored in the backup system.

13. An apparatus, comprising:

one or more memories storing processor-executable code; and one or more processors coupled with the one or more memories and individually or collectively operable to execute the code to cause the apparatus to:

obtain, at a backup system, a new snapshot of a relational database of a source computing environment, wherein the backup system comprises:

a set of backup database tables associated with a set of source database tables of the relational database of the source computing environment, and a set of metadata tables that describe a schema of the relational database of the source computing environment, and wherein the set of backup database tables and the set of metadata tables comprise respective first versioning control columns and respective second versioning control columns;

compare the new snapshot of the relational database to a prior snapshot of the relational database;

update, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot; and add, in response to the comparison indicating that the data of the row of the relational database table changed, an additional row to the corresponding backup database table, wherein a field of the respective first versioning control column of the additional row comprises an indication of the version of the new snapshot.

14. The apparatus of claim 13, wherein the field of the respective second versioning control column of the additional row includes an indication that the data of the additional row is live data in the relational database.

15. The apparatus of claim 13, wherein:

the respective first versioning control columns comprise first fields that each indicate a respective first snapshot version in which data of the corresponding row was created or modified; and the respective second versioning control columns comprise second fields that each indicate a respective second snapshot version in which data of the corresponding row is rendered stale or that indicates that the data of the corresponding row is active.

16. The apparatus of claim 13, wherein the one or more processors are individually or collectively further operable to execute the code to cause the apparatus to:

update, in response to the comparison indicating that the schema of the relational database has changed between the prior snapshot and the new snapshot, a corresponding metadata table of the set of metadata tables to indicate that the schema has changed.

17. A non-transitory computer-readable medium storing code, the code comprising instructions executable by one or more processors to:

obtain, at a backup system, a new snapshot of a relational database of a source computing environment, wherein the backup system comprises:

a set of backup database tables associated with a set of source database tables of the relational database of the source computing environment, and a set of metadata tables that describe a schema of the relational database of the source computing environment, and wherein the set of backup database tables and the set of metadata tables comprise respective first versioning control columns and respective second versioning control columns;

compare the new snapshot of the relational database to a prior snapshot of the relational database;

update, in response to the comparison indicating that data of a row of a relational database table of the relational database changed between the prior snapshot and the new snapshot, a field of the respective second versioning control column of a corresponding row of a corresponding backup database table of the set of backup database tables to indicate a version of the new snapshot; and add, in response to the comparison indicating that the data of the row of the relational database table changed, an additional row to the corresponding backup database table, wherein a field of the respective first versioning control column of the additional row comprises an indication of the version of the new snapshot.

18. The non-transitory computer-readable medium of claim 17, wherein the field of the respective second versioning control column of the additional row includes an indication that the data of the additional row is live data in the relational database.

19. The non-transitory computer-readable medium of claim 17, wherein:

the respective first versioning control columns comprise first fields that each indicate a respective first snapshot version in which data of the corresponding row was created or modified; and the respective second versioning control columns comprise second fields that each indicate a respective second snapshot version in which data of the corresponding row is rendered stale or that indicates that the data of the corresponding row is active.

20. The non-transitory computer-readable medium of claim 17, wherein the instructions are further executable by the one or more processors to:

update, in response to the comparison indicating that the schema of the relational database has changed between the prior snapshot and the new snapshot, a corresponding metadata table of the set of metadata tables to indicate that the schema has changed.

* * * * *